US010013029B2

(12) United States Patent
Senatori et al.

(10) Patent No.: US 10,013,029 B2
(45) Date of Patent: *Jul. 3, 2018

(54) LOCKING ASSEMBLIES FOR COMPUTING DEVICES

(71) Applicant: Hewlett-Packard Development Company, L.P., Houston, TX (US)

(72) Inventors: Mark David Senatori, Austin, TX (US); Aki Laine, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/671,701

(22) Filed: Aug. 8, 2017

(65) Prior Publication Data

US 2017/0336834 A1 Nov. 23, 2017

Related U.S. Application Data

(63) Continuation of application No. 15/469,092, filed on Mar. 24, 2017, now Pat. No. 9,778,703, which is a continuation of application No. 15/024,850, filed as application No. PCT/US2013/070442 on Nov. 15, 2013.

(51) Int. Cl.
*G06F 1/16* (2006.01)
*E05C 17/56* (2006.01)

(52) U.S. Cl.
CPC ............ *G06F 1/1679* (2013.01); *G06F 1/162* (2013.01); *G06F 1/1616* (2013.01); *G06F 1/1637* (2013.01)

(58) Field of Classification Search
CPC ...... G06F 1/1679; G06F 1/162; G06F 1/1616; G06F 1/1637
USPC ............ 361/679.26, 679.27, 679.55–679.59; 292/251.5
See application file for complete search history.

(56) References Cited

U.S. PATENT DOCUMENTS

| 7,184,263 | B1 | 2/2007 | Maskatia |
| 8,259,437 | B2 | 9/2012 | Vesely |
| 8,976,519 | B2 | 3/2015 | Lai et al. |
| 9,072,174 | B2 | 6/2015 | Lin |
| 9,189,015 | B2 * | 11/2015 | Tseng ................. G06F 1/16 |
| 9,215,818 | B2 | 12/2015 | Chen et al. |
| 9,277,671 | B2 * | 3/2016 | Tsai ................... G06F 1/162 |
| 9,395,752 | B2 * | 7/2016 | Chen .................. G06F 1/1616 |
| 2005/0041381 | A1 * | 2/2005 | Maskatia ............ G06F 1/1616 |
| | | | 361/679.06 |

(Continued)

FOREIGN PATENT DOCUMENTS

| CN | 1831705 A | 9/2006 |
| CN | 201583860 U | 9/2010 |

(Continued)

*Primary Examiner* — Nidhi Thaker
(74) *Attorney, Agent, or Firm* — HPI Patent Department

(57) ABSTRACT

A locking assembly may be to locate a display member of a computing device relative to a base member of the computing device. A spring may be to attach to the display member. A first magnetic member may be in contact with to the spring. A wheel may be to attach to the display member to roll on the base member. A lock may be to engage the spring to lock the wheel when the first magnetic member is in proximity to a second magnetic member of the base member such that a magnetic force is exerted therebetween.

13 Claims, 12 Drawing Sheets

(56) References Cited

U.S. PATENT DOCUMENTS

| | | |
|---|---|---|
| 2005/0083644 A1 | 4/2005 | Song |
| 2009/0103261 A1 | 4/2009 | Shih |
| 2012/0194977 A1 | 8/2012 | Liu et al. |
| 2013/0155596 A1 | 6/2013 | Sun |
| 2013/0242490 A1 | 9/2013 | Ku |
| 2013/0283574 A1 | 10/2013 | Sie |
| 2013/0329351 A1* | 12/2013 | Lin ............... H05K 5/0239 361/679.27 |
| 2014/0063720 A1* | 3/2014 | Chang ............. G06F 1/1637 361/679.27 |
| 2014/0306463 A1* | 10/2014 | Ho ................ E05C 19/16 292/251.5 |
| 2015/0346775 A1* | 12/2015 | Tseng ............. G06F 1/16 361/679.27 |
| 2015/0378399 A1* | 12/2015 | Grinstead ......... G06F 1/1681 361/679.09 |
| 2016/0252927 A1* | 9/2016 | Senatori .......... G06F 1/162 361/679.27 |
| 2017/0045912 A1* | 2/2017 | Hsu ............... G06F 1/1677 |

FOREIGN PATENT DOCUMENTS

| | | |
|---|---|---|
| CN | 201994995 U | 9/2011 |
| JP | 2013-030054 | 2/2013 |

* cited by examiner

LOCKING ASSEMBLIES FOR COMPUTING DEVICES

PRIORITY APPLICATION INFORMATION

This application is a continuation of U.S. patent application Ser. No. 15/469,092, filed on Mar. 24, 2017, which is a continuation of U.S. National Entry application Ser. No. 15/024,850, filed on Mar. 24, 2016, which claims priority to International Application No. PCT/US2013/070442, filed on Nov. 15, 2013. The contents of which are incorporated herein by reference in its entirety.

BACKGROUND

Various mobile computing devices are available such as laptops and tablets. A laptop may include a display and a physical input device separate from the display. A tablet computer may be a one-piece mobile device having a touchscreen that may be navigated by a fingertip or stylus.

BRIEF DESCRIPTION OF THE DRAWINGS

Some examples are described with respect to the following figures.

DETAILED DESCRIPTION

Figure 1:
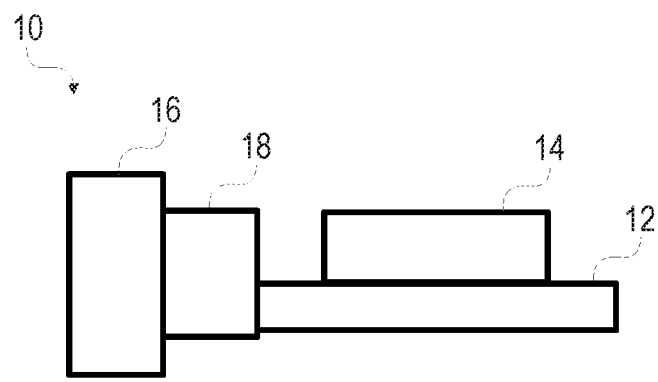
FIG. 1 is a schematic view of a locking assembly according to some examples.

The following terminology is understood to mean the following when recited by the specification or the claims. The singular forms "a," "an," and "the" mean "one or more." The term "attached" includes both direct forms of attachment and indirect forms of attachment such as where one or more intervening elements may be included between the parts being attached. The terms "including" and "having" are intended to have the same inclusive meaning as the term "comprising."

Some existing computing devices having multiple modes of operation may not, for example, be effectively transitioned between and/or maintained within modes. Additionally, such computing devices may, for example, be damaged due to contact between a base member and a display member of the computing device. Accordingly, the present disclosure concerns locking assemblies of computing devices.

In some examples, the computing devices of the present disclosure can be transitioned between a "laptop mode" to operate as a laptop, a "tablet mode" to operate as a tablet, and a "closed mode" in which the computing device is closed, for example when the display screen and the keyboard inwardly face each other. The term "computing device" encompasses any device with computing capability. The term "laptop" encompasses any of a number of different computing devices having a display screen and a separate input device such as a keyboard. The term "tablet" encompasses any of a number of different computing devices having a display screen that operates as a touchscreen that can be navigated by an input stimulus such as a fingertip or stylus.

The computing device may include a display member attached to a base member via a hinge assembly having two hinges. The display member may pivot about two independent pivotal axes of rotation relative to the base member using the two hinges. The two pivotal axes may operate independently of each other. The computing device may be transitioned between its modes using the two pivotal axes.

In the closed mode, the display member may be stacked in parallel on the base member such that a display screen of the display member and a keyboard of the base member are facing inwardly toward each other. In the laptop mode, the display member may be oriented at an angle, for example an obtuse angle, relative to the base member to allow the user to view a display screen of the display member. A user may transition the computing device between the closed mode and the laptop mode by rotating the display member about the first pivotal axis of rotation. In the tablet mode, the display member may be oriented such that the display screen is facing outwardly away from the base member, and such that the keyboard of the base member is facing inwardly toward the back side of the display member. The display screen may be used as a touchscreen that may be navigated by a fingertip or stylus. The user may transition the computing device between the laptop mode and the tablet mode by rotating the display member about the second pivotal axis of rotation.

In some examples, inclusion of a locking assembly in the computing device may allow a user to smoothly transition the computing device between an infinite number of positions in the tablet mode, while also allowing the user to lock the computing device in one or more positions of the tablet mode. Moreover, the locking assembly may reduce and/or eliminate scuffing between the display member and the base member, because the display member may not drag along the base member. Examples of locking assemblies and computing devices having locking assemblies are described as follows.

FIG. 1 is a schematic view of a locking assembly 10 according to some examples. The locking assembly 10 may be to locate a display member of a computing device relative to a base member of the computing device. A spring 12 may be to attach to the display member. A first magnetic member 14 may be in contact with to the spring 12. A wheel 16 may be to attach to the display member to roll on the base member. A lock 18 may be to engage the spring 12 to lock the wheel 16 when the first magnetic member 14 is in proximity to a second magnetic member of the base member such that a magnetic force is exerted therebetween.

Figure 2:
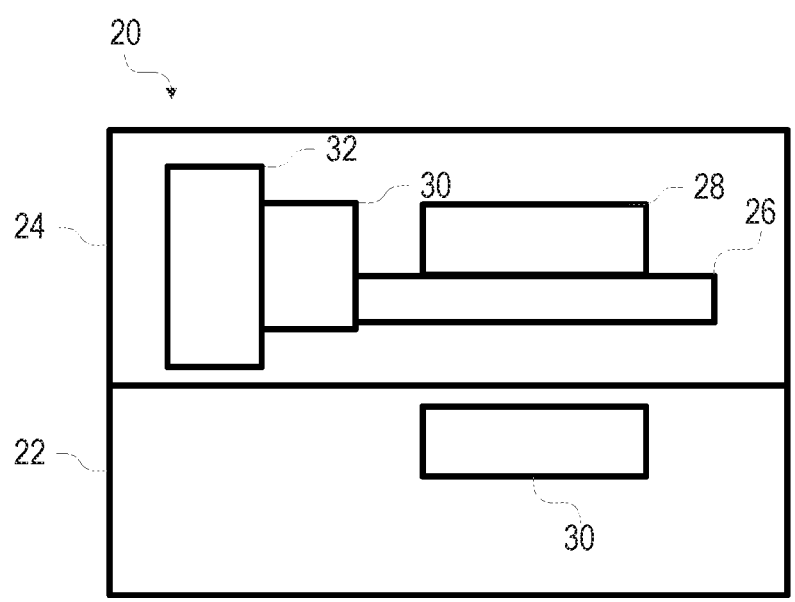
FIG. 2 is a schematic view of a computing device according to some examples.

FIG. 2 is a schematic view of a computing device 20 according to some examples. The computing device may include a base member 22, and a display member 24 rotatably attached to the base member 22. A spring 26 may be attached to the display member 24. A first magnetic member 28 may be in contact with the spring 26. A second magnetic member 30 may be attached to the base member 22. A wheel 32 may be attached to the display member 24 to roll on the base member 22. A lock 34 may be to engage the spring 26 to lock the wheel 32 to locate the display member 24 relative to the base member 22 when the first and second magnetic members 28 and 30 are in proximity such that a magnetic force is exerted therebetween.

A "spring" is any device having suitable dimensions and/or made of suitable materials such that it may have a biased position when no force is applied to the spring and an extended position when a force is applied to the spring. A "magnetic member" is any object made of a suitable material such that it experiences a force in the presence of a magnetic field, and/or itself generates a magnetic field. A "lock" is any device to lock two elements together, for example a wheel and a spring.

FIG. 3-7 respectively are perspective views of a computing device 100 in a closed mode, laptop mode, rear position of a tablet mode, front position of the tablet mode, and compressed position of the tablet mode according to some examples.

The computing device 100 may include a base member 102 and a display member 104. The base member 102 may have a first side 106 and a second side 108. The base member 102 may include input devices such as a keyboard 107 and a touchpad 109 housed on the first side 106. In some examples, the base member 102 may be a capacitive keyboard. The display member 104 may have a first side 110 and a second side 112. The display member 104 may include a display screen 114 housed on the first side 110. The display screen 114 may be liquid-crystal display (LCD) and/or may be touch-enabled to allow navigation by a fingertip or stylus. In some examples, the display screen 114 may not be touch-enabled. The display member 104 may also include a camera, speakers, and/or antennas, for example. One or both of the base member 102 and the display member 104 may house a processor and a memory. The computing device 100 may include a hinge assembly 116. The hinge assembly 116 may include a hinge 122, a rigid plate 124, and hinges 126. A "hinge" allows two elements attached to the hinge to be rotated relative to each other about a pivotal axis of rotation.

Figure 5:
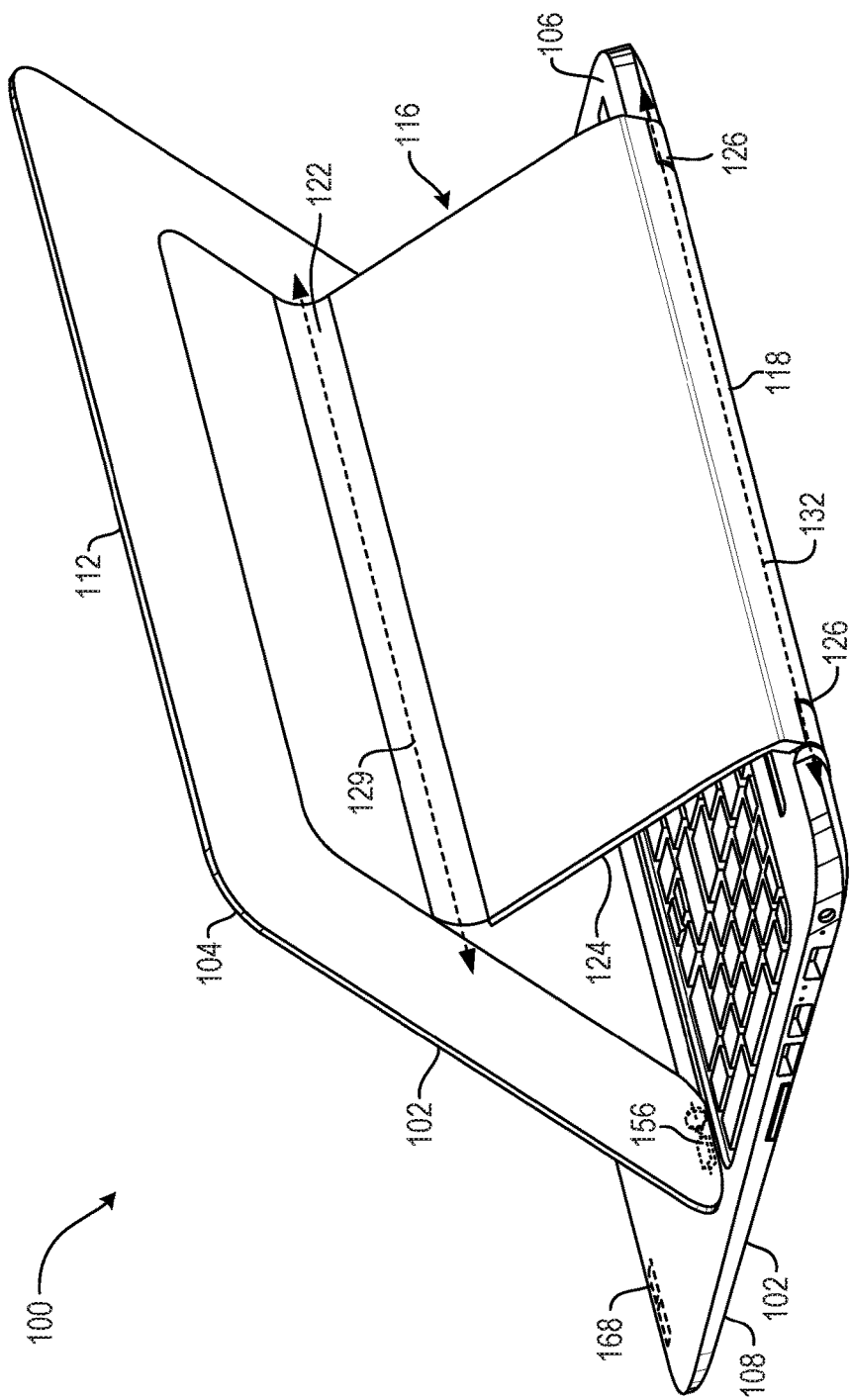
FIG. 5 is a perspective view of a computing device in a rear position of a tablet mode according to some examples.

The computing device 100 may be transitioned between the closed mode and the laptop mode by rotating the display member 104 relative to the base member 102 about a pivotal axis of rotation 132 using the hinges 126. Additionally, the computing device 100 may be transitioned between the laptop mode and the tablet mode by rotating the display member 104 relative to the base member 102 about a pivotal axis of rotation 129 using the hinge 122. Additionally, the transition between the laptop mode and the tablet mode may include rotating the display member 104 relative to the base member 102 about the pivotal axis of rotation 132 using the hinges 126. In some examples, the transition between the laptop mode and the tablet mode may be made by rotating the display member 104 relative to the base member 102 simultaneously about the pivotal axes 129 and 132 using the hinges 122 and 126. The pivotal axes 129 and 132 may be longitudinal axes. Example pivotal axes 129 and 132 are shown in FIG. 5.

In the closed mode, the display member 104 may be stacked in parallel on the base member 102 such that the display screen 114 and the keyboard 107 may be facing inwardly toward each other. In the laptop mode, the display member 104 may be oriented at an angle relative to the base member 102 to allow the user to view a display screen 114. In the tablet mode, the display member 104 may be oriented such that the display screen 114 is facing outwardly away from the base member 102, and such that the keyboard 107 is facing inwardly toward the display member 104.

The hinge 122 may be a flexible hinge or any other suitable hinge. For example, the hinge 122 may be attached to the display member 104 and to the rigid plate 124 by an adhesive such as an epoxy resin. The hinge 122 may be a "flexible sheet", which is a flexible element having a thickness that is small relative to its length and width. In some examples, the hinge 122 may be made of a flexible polymer, for example nylon or polypropylene, or of a flexible metal, such as spring steel or stainless steel, or other flexible materials, or combinations thereof. An element that is "flexible" has suitable dimensions and/or is made of suitable materials such that the element is capable of bending without breaking.

The one or more hinges 126 may be friction hinges. For example, the one or more friction hinges 126 may rotatably attach the base member 102 about the pivotal axis of rotation 132 to the remainder of the elements of the hinge assembly 116. A "friction hinge" is a hinge having a frictional interference fit between its rotating elements. For example, each friction hinge 126 may include an annular gudgeon member 128 and a cylindrical pintle member 130 longitudinally inserted through the gudgeon member 128 along the pivotal axis 132. The pintle member 130, shown in FIG. 3, may frictionally engage the inner surface of the gudgeon member 128 by way of an interference fit wherein the inner surface may exert an inward radial force on the pintle member 130, which may exert a reciprocal outward force on the inner surface. The frictional engagement of these cylindrical mating surfaces may allow the angular position between the hinge assembly 116 and the base member 102 to be maintained or held in place at any desired angle, wherein the permitted range of angles may be between a minimum angle of zero degrees and a maximum angle of 180 degrees, for example. In some examples, the hinges 126 may be made of a metal such as spring steel or stainless steel, or other materials, or combinations thereof.

The rigid plate 124 may have suitable dimensions and be made of suitable materials to provide stiffening and/or structural reinforcement to the hinge assembly 116, and/or to aid in rotation of the display member 104 relative to the base member 102. Inclusion of the rigid plate 124 may thus increase the overall thickness of the hinge assembly 116. However, in some examples, the hinge 122 may extend to the hinges 126, such that there may be no rigid plate 124. An element that is "rigid" has suitable dimensions and/or is made of suitable materials such that it cannot be bent without breaking.

The computing device 100 may include one or more fasteners to secure the hinge assembly 116 in the display member 104 when the computing device 100 is in the closed mode or the laptop mode. For example, the computing device 100 may include one or more of magnetic fasteners, mechanical fasteners, and other types of fasteners.

Figure 4:
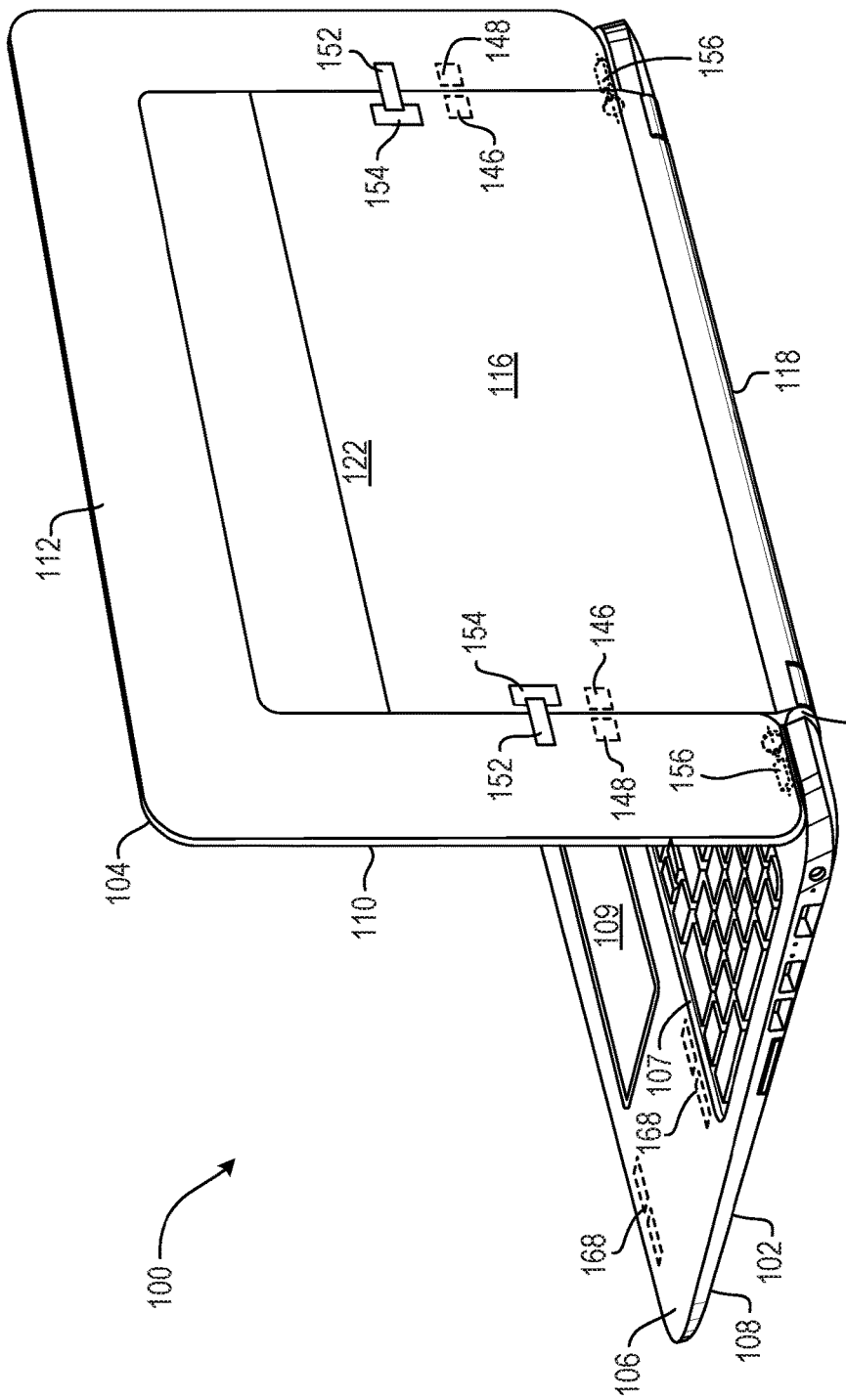
FIG. 4 is a perspective view of a computing device in a laptop mode according to some examples.

In some examples, each magnetic fastener may include a magnetic member 146 in the rigid plate 124 and a magnetic member 148 in the display member 104, as shown in FIG. 4. When the magnetic members 146 and 148 are in proximity, for example when the computing device 100 is in the closed mode or the laptop mode, the magnets 146 and 148 may be sufficiently attracted such that the hinge assembly 116 is held in place in the display member 104. The hinge assembly 116 and display member 104 may be pulled away from each other to transition the computing device 100 to the tablet mode, such that the magnetic members 146 and 148 are no longer in proximity and thus are no longer sufficiently attracted to hold the hinge assembly 116 in the display member 104. As shown in FIG. 4, a magnetic fastener may be included in each side of the display member 104. In some examples, the magnetic members 148 may be included in another part of the hinge assembly 116, for example the hinge 122. In some examples, one of both of the magnetic members 146 and 148 may be a permanent magnet such as a ferromagnet. In some examples, one or both of the magnetic members 146 and 148 may be an antiferromagnet, a ferrimagnet, a paramagnet, a diamagnet, an electromagnet magnetized by current provided by the computing device 100, or other magnetic member. In some examples, one of the magnetic members 146 or 148 may be a permanent magnet, and the other may be any suitable metallic element.

In some examples, each mechanical fastener may include a latch member 152 on the display member 104 and a receiving member 154 on any part of the hinge assembly 116. The hinge assembly 116 may be moved into the display member 104, and the latch member 152 may be inserted into the receiving member 154 to lock the hinge assembly 116 into the display member 104, as shown in FIG. 4. In some examples, the latch member 152 may instead be on the hinge assembly 116 and the receiving member 154 may instead be on the display member 104.

Figure 3:
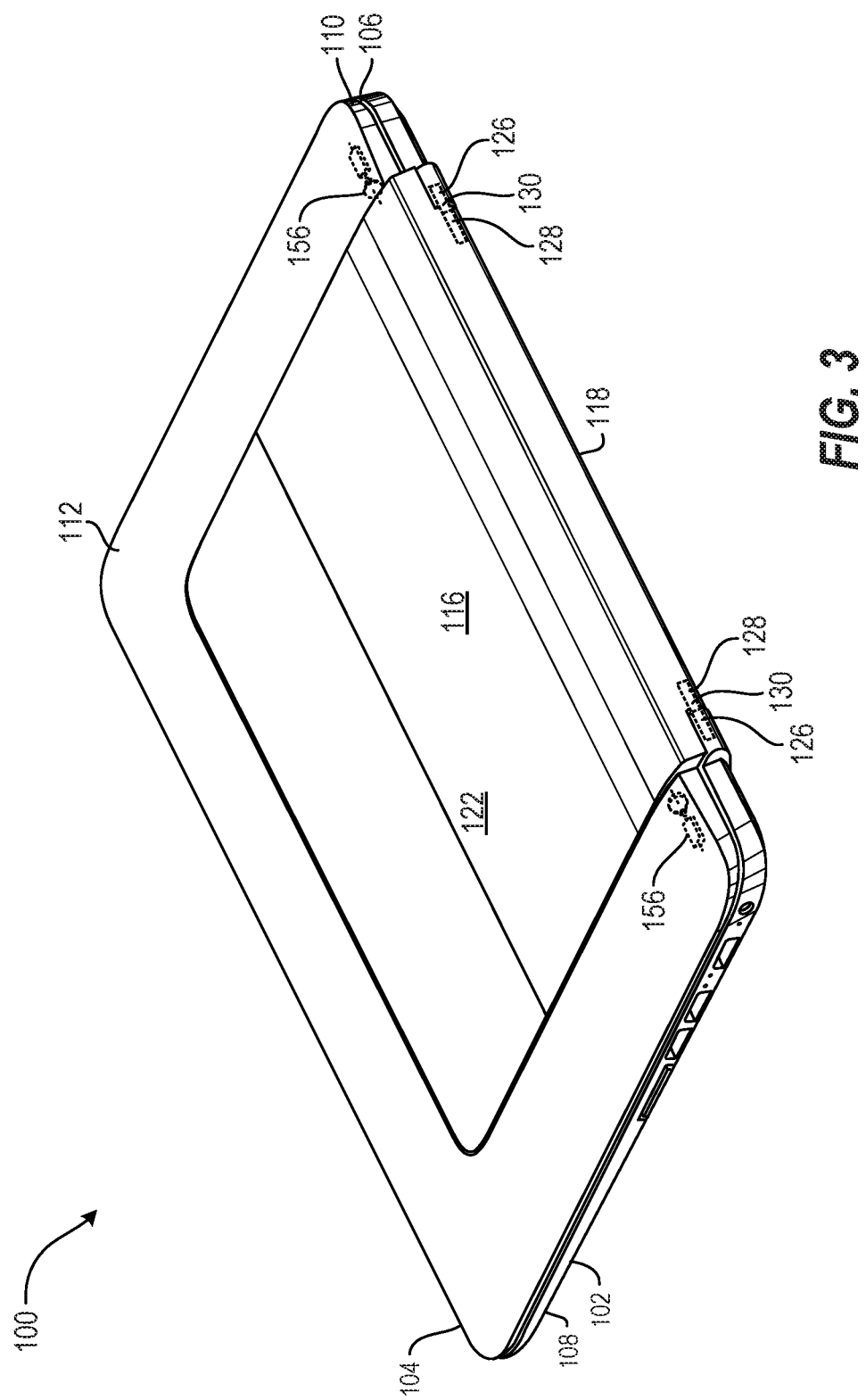
FIG. 3 is a perspective view of a computing device in a closed mode according to some examples.
Figure 6:
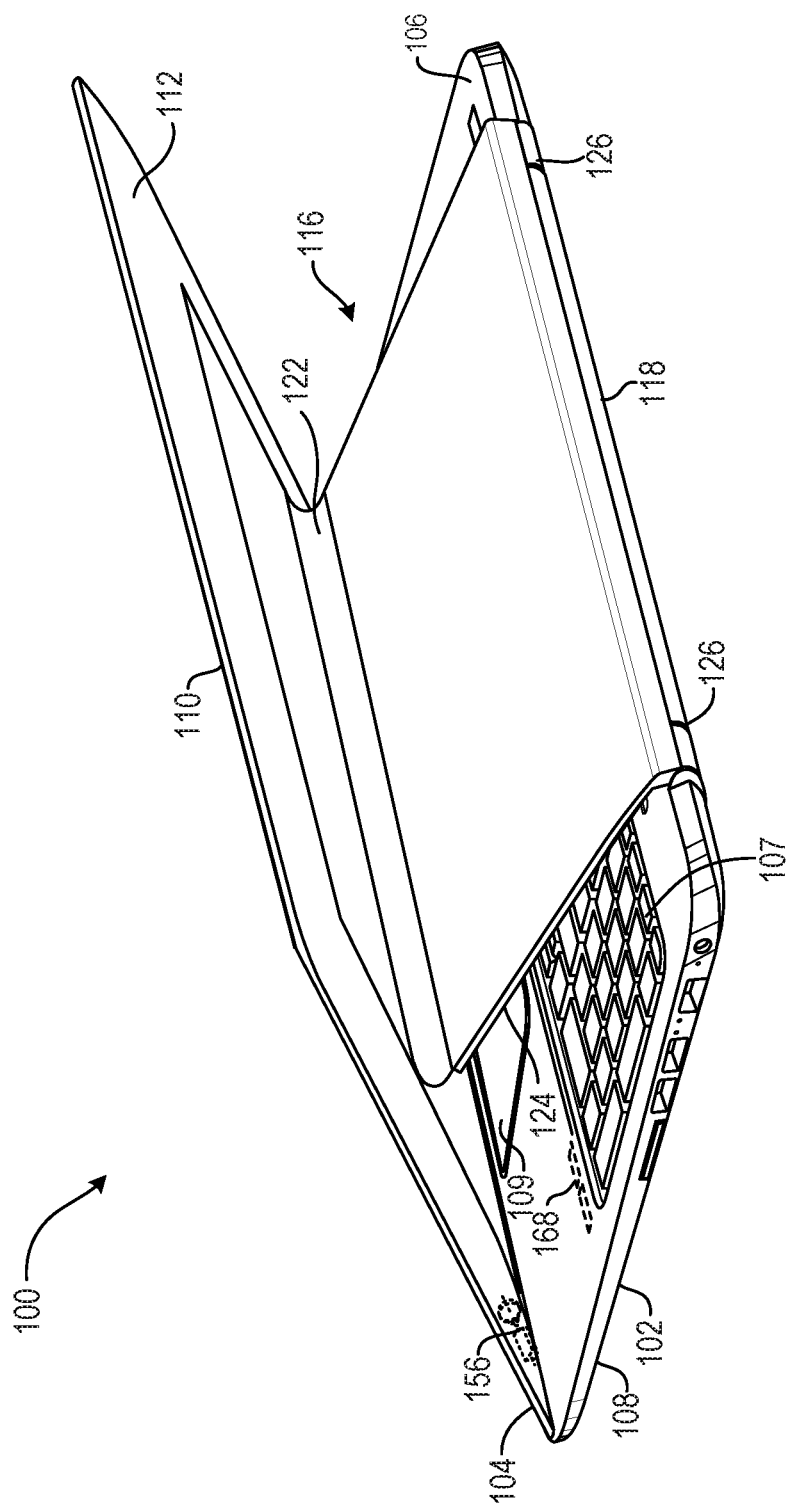
FIG. 6 is a perspective view of a computing device in a front position of a tablet mode according to some examples.
Figure 7:
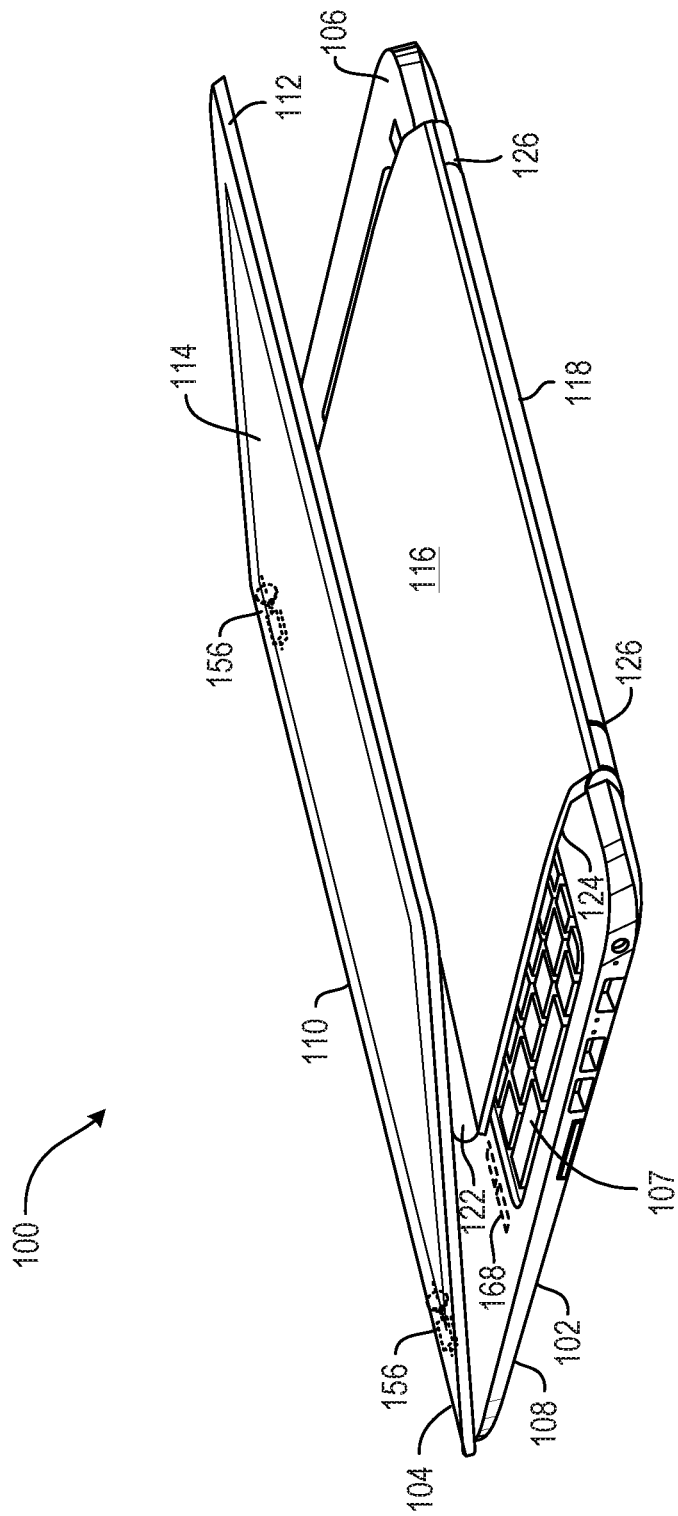
FIG. 7 is a perspective view of a computing device in a compressed position of a tablet mode according to some examples.

Rotation of the display member 104 about the pivotal axis of rotation 129 may be accomplished by bending the hinge 122 from the unbent configuration of FIG. 4 into any of the bent configurations shown in FIGS. 5-7. For example, the hinge 122 may bend away from the display member 104. In some examples, the hinge 122 may have a maximum curvature, such as the U-shaped curve in the compressed position of FIG. 7. In some examples, the hinge 122 may be biased toward the unbent configuration as shown in FIGS. 3-4. In these examples, the bent configurations of the tablet mode in FIGS. 5-7 may be maintained by the weight of the display member 104 and/or by locking assemblies, as will be discussed in more detail. In other examples, the hinge 122 may be biased toward any one of the bent configurations of FIGS. 5-7. In these examples, the unbent configurations of FIGS. 3-4 may be maintained by the fasteners discussed earlier. However, the fasteners may be included to add stability regardless of the biasing choice of the hinge 122.

In examples in which the computing device 100 does not have a closed mode, the hinges 126 may not rotate sufficiently to transition the computing device 100 from the laptop mode to the closed mode. Thus, for example, the computing device 100 may instead be stowed away in the tablet mode.

The display member 104 may contact any position of the base member 102, along a continuum between the laptop mode of FIG. 4, the rear position of the tablet mode of FIG. 5, and the front position of the tablet mode of FIG. 6, and the compressed position of FIG. 7. Various locking assemblies 156 may be included in the base member 102 and/or the display member 104 to locate the display member 104 relative to the base member 102 in one or more positions. The locking assemblies 156 each may have a spring, magnetic member, lock, wheel, and shaft, as will be discussed in more detail in FIGS. 8-17. Thus, additional stability may be provided to the display member 104, such that if a user pushes against the display screen 114, the display member 104 may not move relative to the base member 102 unless a sufficient threshold amount of force is applied to the base member 102.

Figure 8:
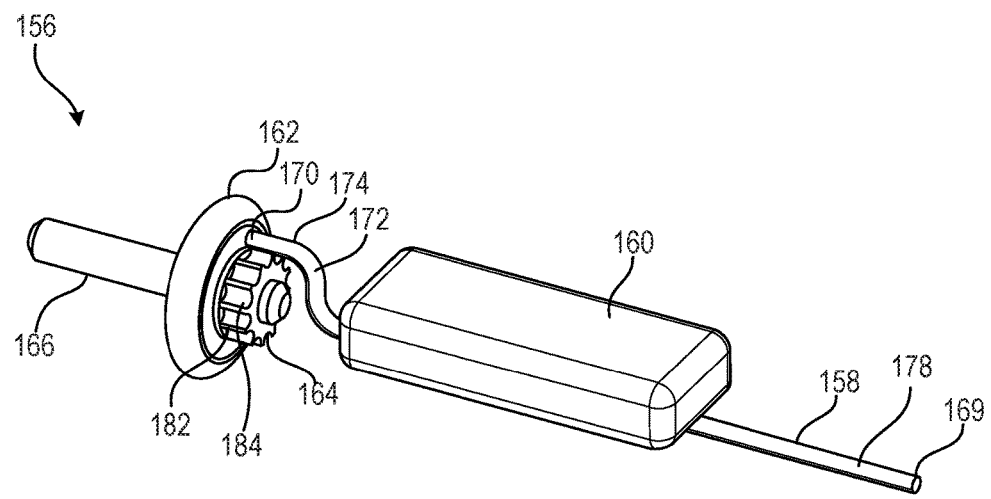
FIGS. 8-9 are perspective views of a locking assembly respectively in an unlocked position and a locked position according to some examples.
Figure 9:
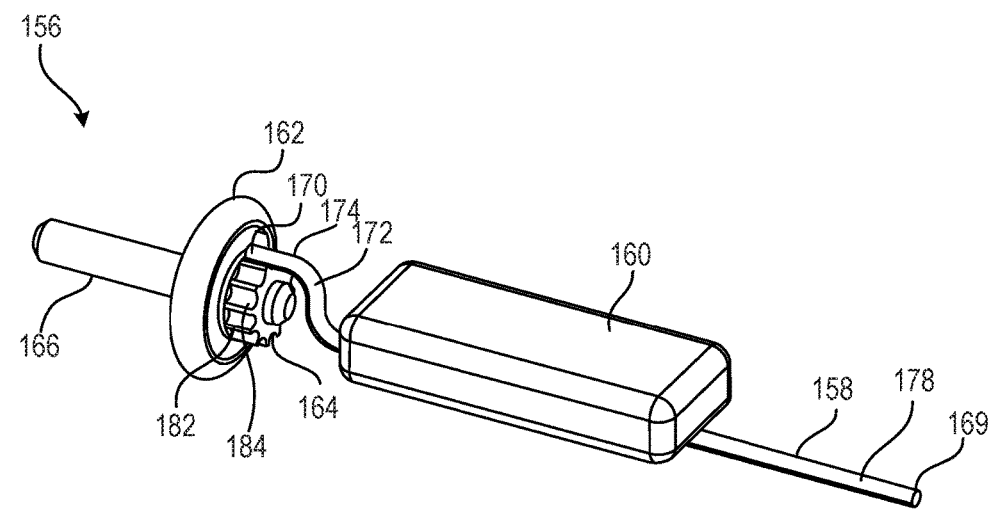
Figure 10:
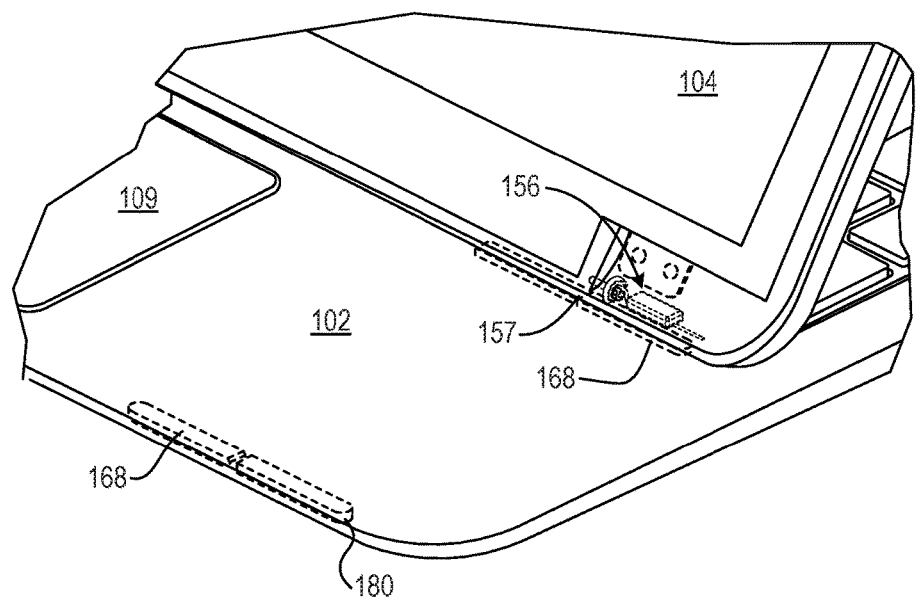
FIG. 10 is a perspective view of the computing device having the locking assembly according to some examples.
Figure 11:
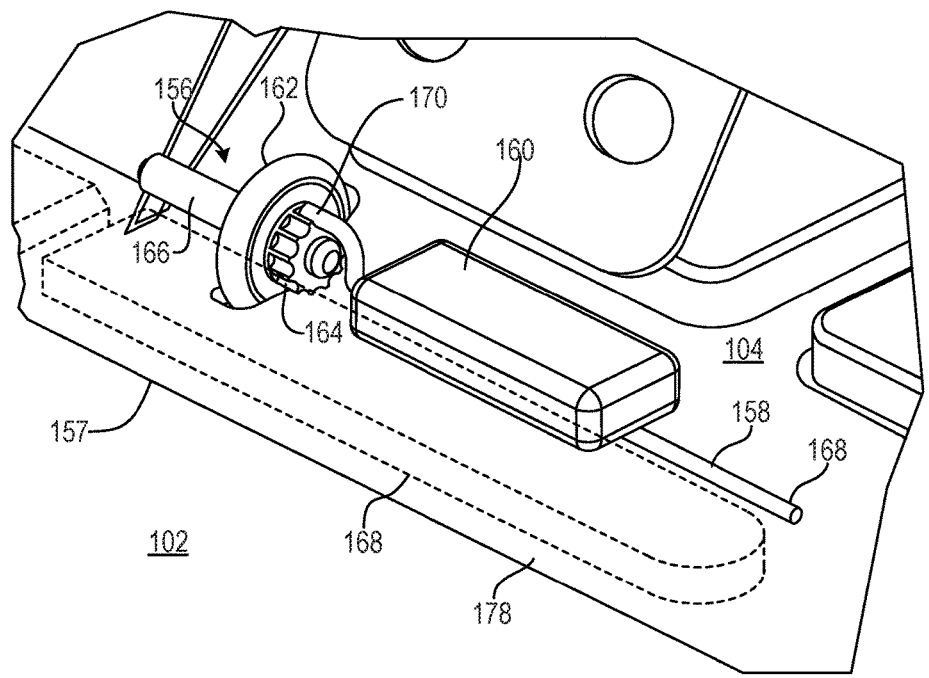
FIG. 11 is a close-up perspective view of the computing device having the locking assembly according to some examples.
Figure 12:
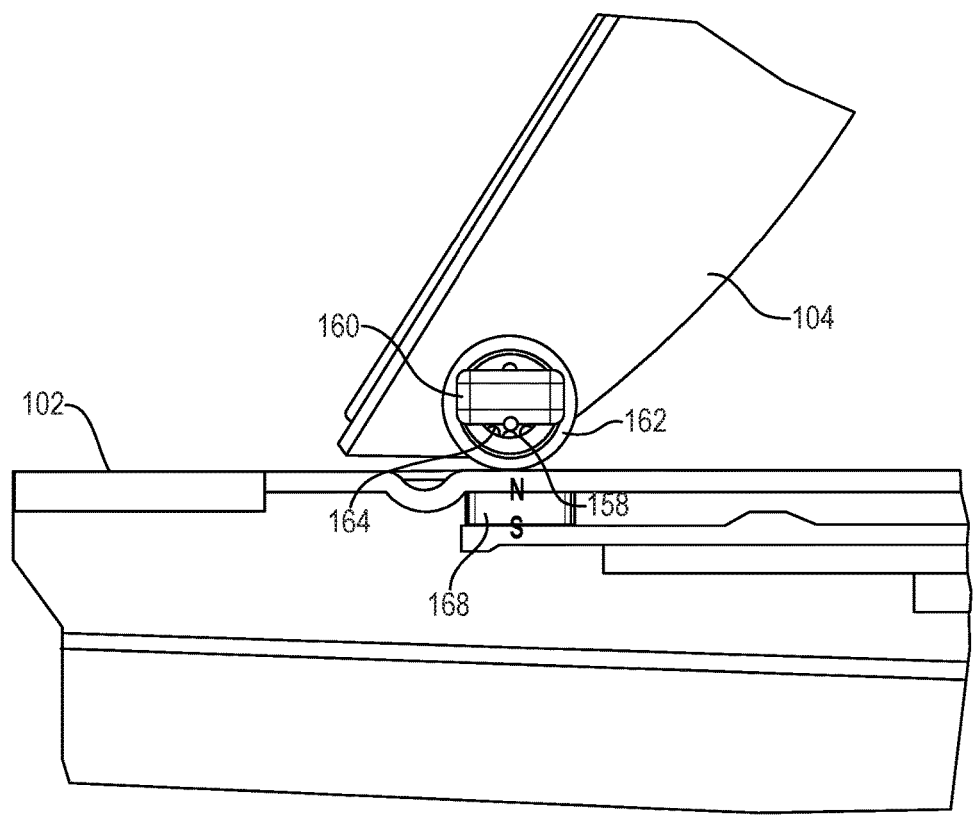
FIGS. 12-13 are cross-sectional side views of the computing device having the locking assembly respectively at first and second predetermined locking points according to some examples.
Figure 13:
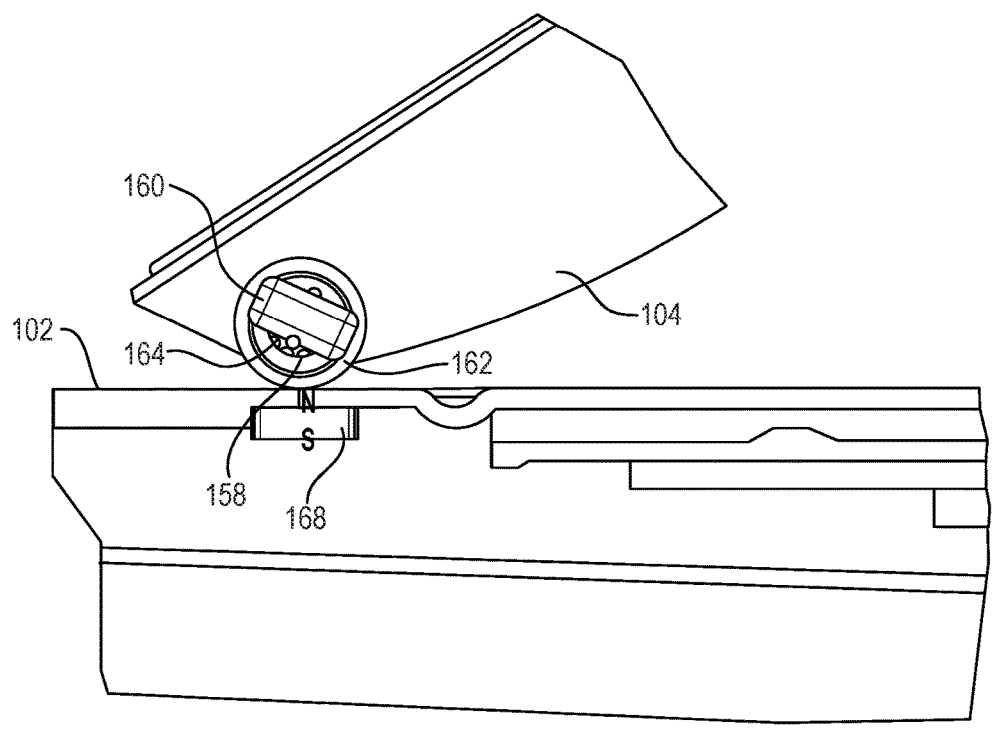

FIGS. 8-9 are perspective views of a locking assembly 156 respectively in an unlocked position and a locked position, according to some examples. FIG. 10 is a perspective view of the computing device 100 having the locking assembly 156 according to some examples. FIG. 11 is a close-up perspective view of the computing device 100 having the locking assembly 156 according to some examples. FIGS. 12-13 are cross-sectional side views of the computing device 100 having the locking assembly 156 respectively at first and second predetermined locking points according to some examples.

The locking assembly 156 may include a spring 158, magnetic member 160, a wheel 162, a lock 164, and a shaft 166. The locking assembly 156 may be included at a bottom portion 157 of the display member 104. Additionally, the computing device 100 may include magnetic members 168.

The spring 158 may have suitable dimensions and/or made of suitable materials such that it may have a biased position when no force is applied to the spring 158, such as in FIG. 8, and an extended position when a force is applied to the spring, such as in FIG. 9. In some examples, the spring 158 may be made of steel, such as spring steel or stainless steel, or some other metal, or another suitable material, or a combination thereof. In some examples, the spring 158 may be a "cantilevered spring", which is a spring that is attached at one end but not the other. For example, the spring 158 may be attached at its first end 169 to the display member 104, and may have a second end 170 which may be a free end not attached to any other elements. In some examples, the attachment at the first end 169 may be rigid. Additionally or alternatively, the spring 158 and display member 104 may be attached via a hinge, such as a friction hinge, to aid in the movement of the spring 158 between the biased position and the extended position. As shown in FIGS. 8-13, the spring 158 may be a solid wire, such as a solid cylindrical wire, and may have a bend 172 in its middle separating a raised section 174 and a lower section 176. However, in other examples, the spring 158 may be a hollow wire, such as a hollow cylindrical wire. In other examples, the spring 158 may be a sheet, which has a thickness that is small relative to its length and width. In other examples, the spring 158 may be a coil. However, other types of springs may be used, such as springs attached to the display member 104 on both of its ends, springs having other shapes, and/or springs made of other materials. In FIG. 9, the extended position is represented by the spring 158 being pulled downward in response to a magnetic force experienced by the magnetic member 160, as will be discussed.

The magnetic member 160 may be in contact with the spring 158. For example, the magnetic member 160 is shown in FIGS. 8-13 as attached above the spring 158 and at the longitudinal middle of the spring 158 on the lower section 176. Placement on the lower section 176 rather than the raised section 174 allows for the magnetic member 160 to be closer to the magnetic member 168 to increase the magnetic force experienced therebetween. In some examples, the magnetic member 160 may be attached below or to the side of the spring 158, and/or may be attached at any longitudinal point along the spring 158. In other examples, the magnetic member 160 may be attached to the base member 102 via an extension spring, such that it hangs above and/or makes contact with the spring 158 from above. In some examples, the magnetic member 160 may be a permanent magnet such as a ferromagnet. In some examples, the magnetic member 160 may be an antiferromagnet, a ferrimagnet, a paramagnet, a diamagnet, an electromagnet magnetized by current provided by the computing device 100, or other magnetic member. The magnetic member 160 may be made of any suitable material, for example steel such as stainless steel or spring steel, iron, nickel, cobalt, gadolinium, brass, zinc, copper, bronze, aluminum, silver, gold, tungsten, magnesium, or other magnetic material, or a combination thereof. The magnetic member 160 may have any suitable shape, for example a polyhedron such as a cuboid as in FIGS. 8-13, a cylinder, or any other shape.

The magnetic members 168 may be attached to the base member 102. For example, the magnetic members 168 may be attached inside the base member 102 as in FIGS. 10-13. In other examples, the magnetic members 168 may be attached on the surface of the first side 106 of the base member 102. The magnetic members 168 may be any type of magnets, may be made of any material, and may have any of the shapes discussed above relative to the magnetic member 160. In some examples, one or more magnetic members 168 may be located at each of the predetermined locking point 178 and 180. For example, magnetic members 168 may respectively be located at the left and right sides of the base member 102 at each of the predetermined locking points 178 and 180. In FIGS. 10-13, two predetermined locking points 178 and 180 are shown corresponding to the front and rear positions of the tablet mode. However in other examples, there may any additional number of predetermined locking points each having magnetic members 168.

The wheel 162 may be attached to the bottom portion 157 display member 104 to roll on the base member 102 during transitioning of the display member 104 along a continuum between an infinite number of positions in the tablet mode. The wheel 162 may be attached to the display member 104 via the shaft 166 as in FIGS. 8-13. However, the wheel 162 may be attached to the display member 104 in any other suitable way. As discussed earlier, the hinge assembly 116 may be used to transition the computing device 100 along a continuum between an infinite number of positions in the tablet mode. In some examples, the wheel 162 may be free to rotate on the shaft 166 or other element, but some resistance may be provided between the wheel 162 and shaft 166 to maintain the display member 104 at any of the infinite positions of the tablet mode, instead of only at the predetermined locking points 178 and 180. For example, a frictional interference fit may be provided by frictionally engaging the annular inner surface of the wheel 162 with the outer surface of the shaft 166, such that they exert reciprocal forces on each other. Thus, in some examples, the display member 104 may move relative to the base member 102 when a threshold amount of force is applied but may not move when less than the threshold amount of force is applied.

The wheel 162 may be made of any suitable material, for example a polymer, plastic, rubber, polyurethane, or a combination thereof. The material may be a soft material such that (1) the wheel 162 may roll smoothly on the display member 104, (2) scuffing between the wheel 162 and the base member 102 is minimized, and (3) the wheel 162 may apply some friction to the display member 104 prevent the wheel 162 from skidding. Additionally, in some examples, because the wheel 162 may contact the base member 102 but the display member 104 may not contact the base member 102, scuffing between the base member 102 and the display member 104 may be minimized.

The lock 164 may be attached, for example rigidly attached, to the side of the wheel facing the spring 158. The lock 164 may, for example, be a gear. As shown in FIGS. 8-9, the gear may be an external gear such that it has a sinusoidal outer surface having a series of alternating cogs 182, e.g. teeth, and recesses 184 around its circumference. As shown in FIGS. 8-9, the cogs 182 and recesses 184 may have rounded surfaces, but other surface shapes may be used as well. The shaft 166, in addition to being inserted through the wheel 162, may similarly be inserted through an annular inner surface of the lock 164 with an interference fit. In other examples, any suitable device other than gear may be used as the lock 164.

The lock 164 may be to lock the wheel 162 to locate the display member 104 relative to the base member 102. If the wheel 162 is rolled along the base member 102, then the bottom portion 157 and the magnetic member 160 may eventually be adjacent to one or more magnetic members 168 at one of the predetermined locking points 178 or 180. Because the magnetic members 160 and 168 may to be in proximity, a magnetic force may exerted between the magnetic members 160 and 168. Any combinations of materials and shapes of the magnetic members 160 and 168 may be selected such that a magnetic force is exerted between the magnetic members 160 and 168 when they are in proximity. For example, the magnetic member 160 may be attracted to the magnetic member 168. The magnetic member 168 may be a permanent magnet or electromagnet having a magnetization with either N or S facing upwards toward the magnetic member 160, and the magnetic member 160 may be any metal that experiences attraction with the permanent magnet or electromagnet. FIGS. 12-13 show the N pole facing upwards. In other examples, the magnetic member 160 may be a permanent magnet or electromagnet having a magnetization with either N or S facing downwards toward a magnetic member 168, and the magnetic member 168 may be any metal that experiences attraction with the permanent magnet or electromagnet. In other examples, the magnetic members 160 and 168 may each be permanent magnets or electromagnets with and N pole of one facing an S pole of the other to cause attraction. Any other suitable combination of types and orientations of the magnetic members 160 and 168 may be used.

As discussed earlier, the magnetic member 160 may contact the spring 158 from above, either by attachment or by being attached to the base member 102 by an extension spring such that it hangs above and/or makes contact with the spring 158 from above. The magnetic force, such as the attractive force, may cause the magnetic member 160 to move towards the spring 158 and the magnetic member 168, causing it to press against the spring 158 to transition the spring 158 from the biased position of FIG. 8 to the extended position of FIG. 9 to engage the wheel 162. For example, the second end 170 of the spring 158 may fall into one of the recesses 184. When the spring 158 is lodged in the recess 184, the wheel 162, which is attached to the lock 164, may not be able to roll. Thus, the display member 104 may be maintained in place relative to the base member 102 such that a user may operate the computing device 100 in the tablet mode.

As discussed earlier, in some examples, resistance may be provided between the wheel 162 and shaft 166 to maintain the display member 104 at any of the infinite positions of the tablet mode, such that a threshold amount of force may need to be applied to move the display member 104 relative to the base member 102. The locking implemented by the lock 164 my provide an additional amount of resistance to movement, such that a higher amount of force may be needed to move the display member 104 relative to the base member 102 when the display member 104 is located in one of the predetermined locking points 178 or 180. To overcome the resistance provided by the lock 164, the user may apply a force to the display member 104 such that the spring 158 may roll on the rounded surface of the recess 184 such that the spring 158 is removed from the recess 184. As the user continues to apply sufficient force to the display member 104, the wheel 162 may roll until the display member 104 is no longer located at one of the predetermined locking points 178 or 180. Thus, the magnetic member 160 may no longer experience magnetic attraction, and the spring 158 may return to the biased position of FIG. 8, allowing the wheel 162 to roll more easily between the predetermined locking points 178 or 180.

FIGS. 10-12 show the locking assembly 156 locked at predetermined locking point 178 in the rear position of the tablet mode. As shown, the magnetic member 160's bottom surface, which may be an S or N pole if the magnetic member 160 is magnetized, is parallel to the top surface of the magnetic member 168. As the computing device 100 is transitioned to be locked at the predetermined locking point 180 in the front position of the tablet mode as shown in FIG. 13, the bottom surface of magnetic member 160 may no longer be parallel with the top surface of the magnetic member 168. Instead, the magnetic member 160 may be tilted at an angle due to the change in angle of the display member 104. However, even if the magnetic member 160 is magnetized such that its tilted bottom surface has an S or N pole, the magnetic members 160 and 168 may still experience a sufficient magnetic force e.g. an attractive force for locking at the predetermined locking point 180 in the front position. In some examples, in which the magnetic member 168 is magnetized but the magnetic member 160 is not initially magnetized e.g. is not a ferromagnet, then the poles in the magnetic member 160 may be generated at an angle with respect to the surfaces of the magnetic member 160 when in proximity to the magnetic member 168.

Figure 14:
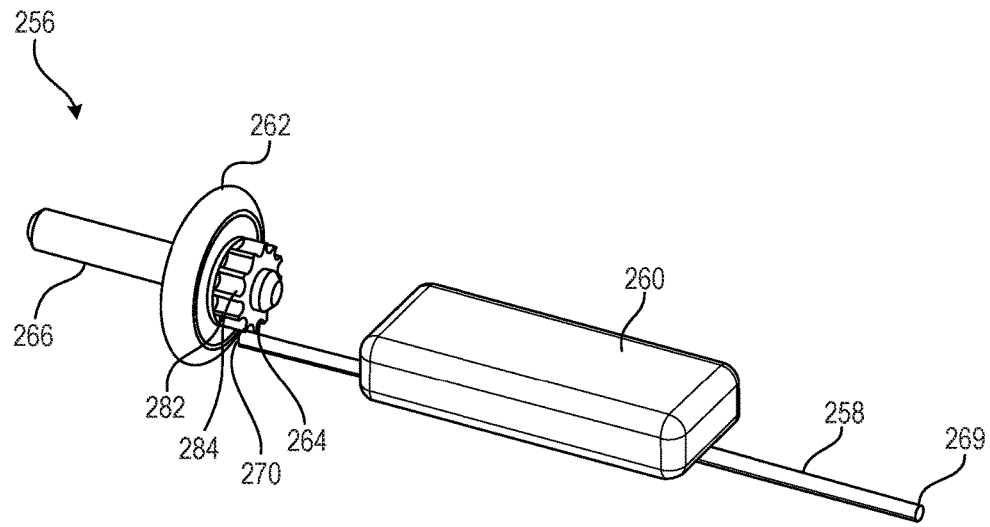
FIGS. 14-15 are perspective views of a locking assembly respectively in an unlocked position and a locked position according to some examples.
Figure 15:
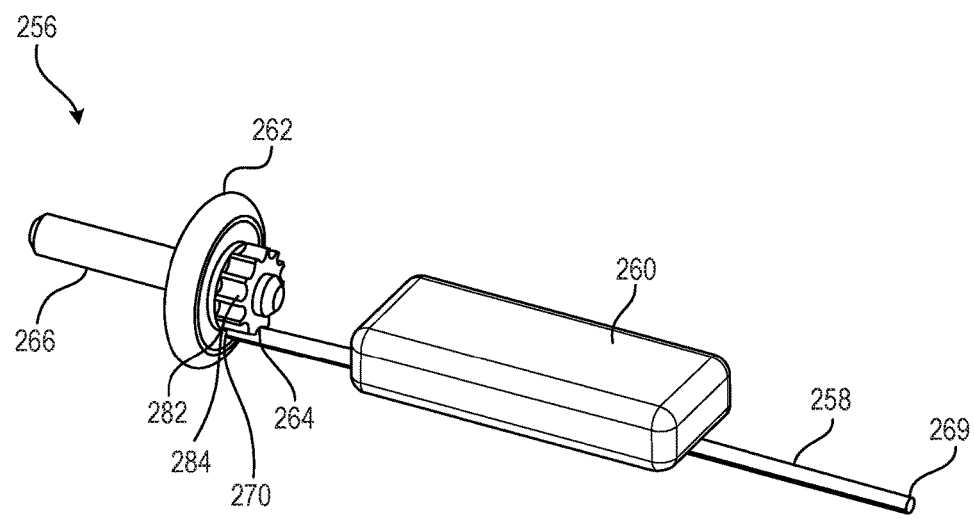

FIGS. 14-15 are perspective views of a locking assembly 256 respectively in an unlocked position and a locked position, according to some examples. The locking assembly 256 may include a spring 258 having first and second ends 269 and 270, a magnetic member 260, a wheel 262, a lock 264 having cogs 282 and recesses 284, and a shaft 266 similar to those of the locking assembly 156. However, the locking assembly 256 may use a repulsive magnetic force rather than an attractive magnetic force. For example, the magnetic members 160 and 368 may each be permanent magnets or electromagnets with and N pole of one facing an N pole of the other, or an S pole of one facing an S pole of another, to cause repulsion. The spring 258 may be a solid wire, such as a solid cylindrical wire, and may extend longitudinally without a bend. The magnetic member 260 may be in contact with the spring 258. For example, the magnetic member 260 is shown in FIGS. 14-15 as attached above the spring 258 and at the longitudinal middle of the spring 258.

When the magnetic members 260 and 168 are in proximity when the display member 104 is transitioned to one of the predetermined locking points 178 or 180, the magnetic member 260 may be repelled from the magnetic member 168. The repulsive force may cause the magnetic member 260 to move away from the magnetic member 168, causing it to press against the spring 258 to transition the spring 258 from the biased position of FIG. 14 to the extended position of FIG. 15 to engage the wheel 262. For example, the second end 270 of the spring 258 may fall into one of the recesses 284. When the spring 258 is lodged in the recess 284, the wheel 262, which is attached to the lock 264, may not be able to roll. Thus, the display member 104 may be maintained in place relative to the base member 102 such that a user may operate the computing device 100 in the tablet mode.

Figure 16:
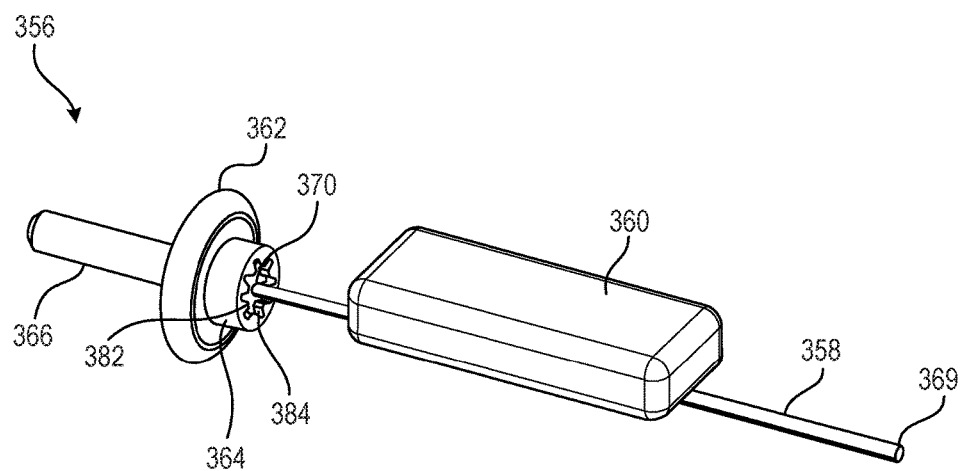
FIGS. 16-17 are perspective views of a locking assembly respectively in an unlocked position and a locked position according to some examples.
Figure 17:
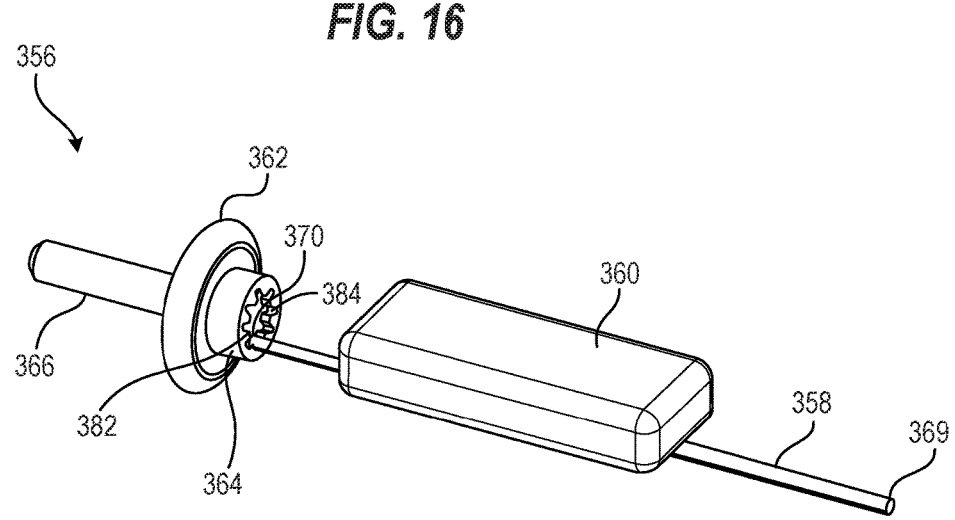

FIGS. 16-17 are perspective views of a locking assembly 356 respectively in an unlocked position and a locked position, according to some examples. The locking assembly 356 may include a spring 358 having first and second ends 369 and 370, magnetic member 360, a wheel 362, a lock 364, and a shaft 366 similar to those of the locking assembly 156. However, the locking assembly 356 may instead be an internal gear such that it has a sinusoidal inner surface having a series of alternating cogs 382, e.g. teeth, and recesses 384 around its circumference. As shown in FIGS. 9-10, the cogs 382 and recesses 384 may have rounded surfaces, but other surface shapes may be used as well. The shaft 366 may be inserted through the wheel 362 with an interference fit, but may not additionally extend through the internal gear. The spring 358 may extend longitudinally without a bend.

When the magnetic members 360 and 168 are in proximity when the display member 104 is transitioned to one of the predetermined locking points 178 or 180, the magnetic member 360 may be attracted to the magnetic member 168. The attractive magnetic force may cause the magnetic member 360 to move towards the spring 358 and the magnetic member 168, causing it to press against the spring 358 to transition the spring 358 from the biased position of FIG. 16 to the extended position of FIG. 17 to engage the wheel 362. For example, a second end 370 of the spring 358 may fall into one of the recesses 384. When the spring 358 is lodged in the recess 384, the wheel 362, which is attached to the lock 364, may not be able to roll. Thus, the display member 104 may be maintained in place relative to the base member 102 such that a user may operate the computing device 100 in the tablet mode. In yet other examples, the magnetic member 360 may engage the internal gear based on a repulsive force between the magnetic member 360 and the magnetic member 168 such that the spring 358 may engage the wheel 362.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

What is claimed is:

1. A computing device, comprising: a display member; a base member; a spring coupled to the display member; a hinge to couple the display member of the computing device to the base member of the computing device; a wheel coupled to the display member to facilitate movement of the display member of the computing device with respect to the base member of the computing device, wherein the wheel is positioned on a bottom portion of the display member of the computing device to roll on the base member; and a lock to engage the spring; wherein the lock includes a gear including cogs and recesses, the lock is coupled to the wheel through a shaft inserted through an annular inner surface of the lock and through an annular inner surface of the wheel; wherein the computing device further comprising: a first magnetic member coupled to the spring; and a second magnetic member coupled to the base member, wherein when the first magnetic member is proximate to the second magnetic member, a magnetic force is exerted to cause the spring to engage the lock.

2. The computing device of claim 1, wherein:
the hinge transitions the computing device into a plurality of configurations of the display member and the base member; and
the wheel is to roll on the base member during the transition of the computing device.

3. The computing device of claim 1, wherein the wheel is coupled to the display member of the computer device via a shaft.

4. The computing device of claim 3, wherein the wheel is to rotate freely about the shaft.

5. The computing device of claim 3, wherein an outer surface of the shaft frictionally engages the annular inner surface of the wheel to exert a reciprocal frictional force on the wheel.

6. A system, comprising: a computing device, wherein the computing device includes: a display member; and a base member; a spring coupled to the display member; a wheel coupled to a bottom portion of the display member to facilitate movement of the display member of the computing device with respect to the base member of the commuting device; and a lock to engage the spring, wherein the wheel is to lock in response to engagement of the lock with the spring; wherein the wheel is positioned on a bottom portion of the display member of the computing device to roll on the base member; and wherein the wheel is to rotate freely about the shaft.

7. The system of claim 6, wherein the lock is coupled to a side of the wheel, wherein the lock is to engage when the wheel is proximate to the spring.

8. The system of claim 6, wherein:
the lock includes a gear including cogs and recesses; and
the lock is coupled to the wheel through a shaft inserted through an annular inner surface of the lock and through an annular inner surface of the wheel.

9. The system of claim 6, further comprising: a first magnetic member coupled to the spring; and a second magnetic member coupled to the base member, wherein when the first magnetic member is proximate to the second magnetic member, a magnetic force is exerted to cause the spring to engage the lock.

10. The system of claim 6, wherein:
the shaft is to frictionally engage an annular inner surface of the wheel to provide a first resistance; and
the lock is to engage the spring to provide a second resistance, wherein the second resistance is greater than the first resistance.

11. The system of claim 6, wherein the lock engages at a predetermined locking point.

12. A locking assembly, comprising: a spring coupled to a display member of a computing device; a first magnetic member coupled to the spring; a wheel to couple to the display member of the computing device; a second magnetic member coupled to a base member of the computing device; and a lock to engage the spring when the first magnetic member is proximate to the second magnetic member; wherein the wheel is to roll on the base member of the computing device; and the wheel is to lock when the lock engages the spring.

13. The locking assembly of claim 12, wherein the spring is to disengage when the first magnetic member is not proximate to the second magnetic member.

* * * * *

UNITED STATES PATENT AND TRADEMARK OFFICE
CERTIFICATE OF CORRECTION

PATENT NO.         : 10,013,029 B2
APPLICATION NO.    : 15/671701
DATED              : July 3, 2018
INVENTOR(S)        : Mark David Senatori et al.

Page 1 of 1

It is certified that error appears in the above-identified patent and that said Letters Patent is hereby corrected as shown below:

In the Claims

In Column 11, Line 16, Claim 3, delete "computer" and insert -- computing --, therefor.

Signed and Sealed this
Fourth Day of December, 2018

Andrei Iancu
*Director of the United States Patent and Trademark Office*